Oct. 11, 1927.  
C. W. BASSETT  
ELEVATOR POSITION INDICATOR  
Filed March 4, 1926  
1,644,866  
2 Sheets-Sheet 2
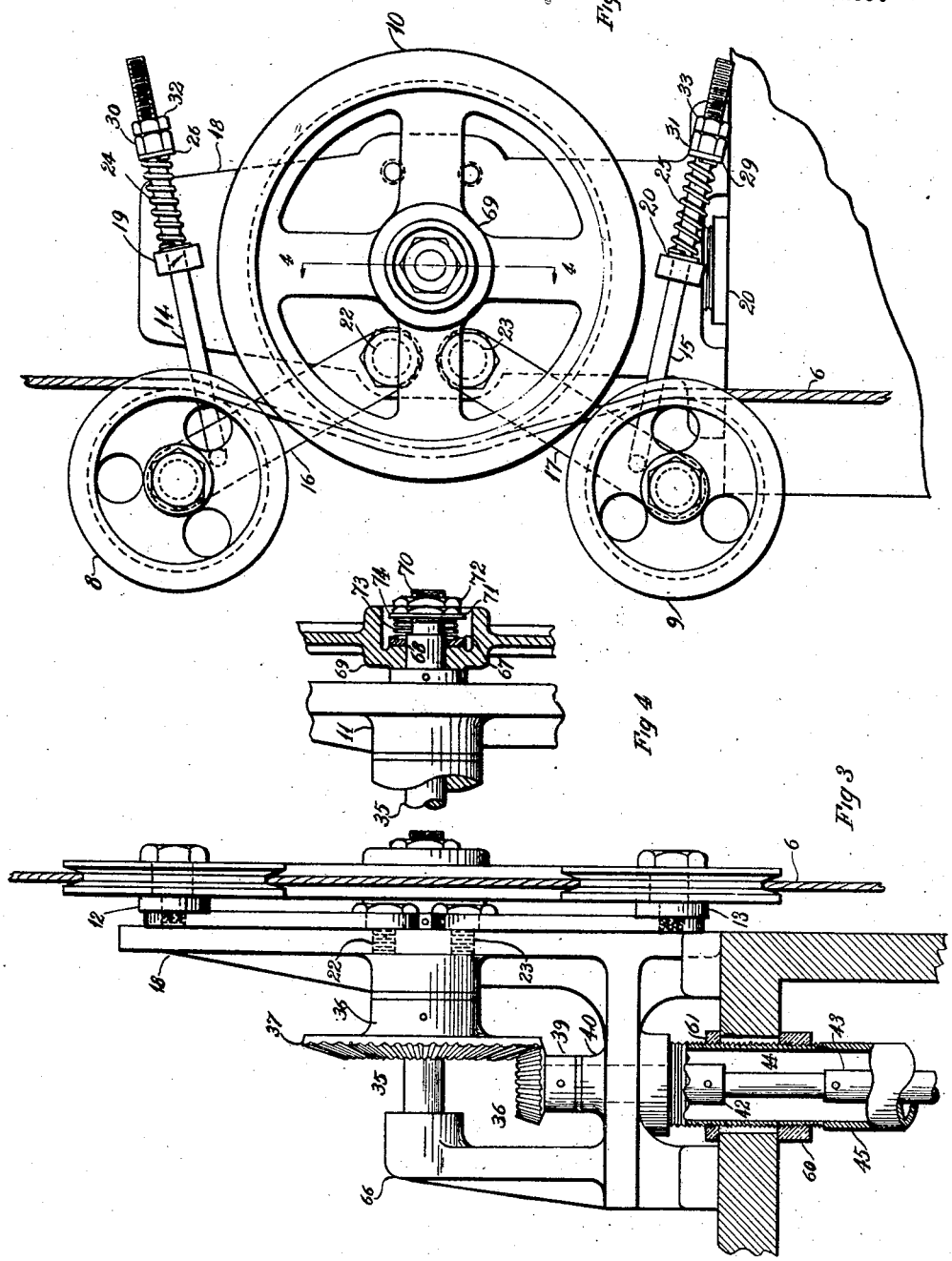
INVENTOR  
Cyrus W. Bassett Patented Oct. 11, 1927.

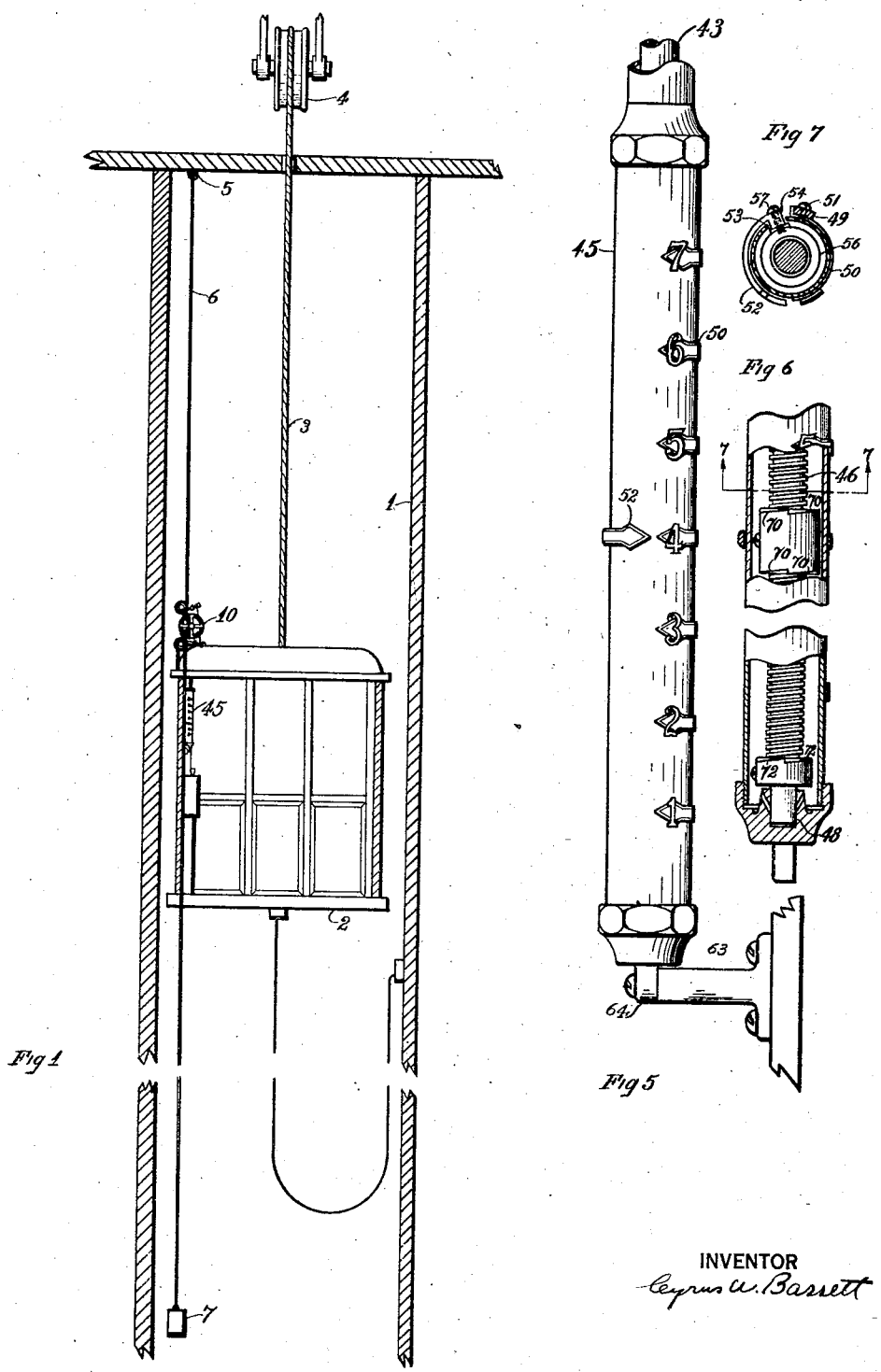

1,644,866

UNITED STATES PATENT OFFICE.

CYRUS W. BASSETT, OF MONTCLAIR, NEW JERSEY, ASSIGNOR TO ELEVATOR SUPPLIES COMPANY, INC., OF HOBOKEN, NEW JERSEY, A CORPORATION OF NEW JERSEY.

ELEVATOR-POSITION INDICATOR.

Application filed March 4, 1926. Serial No. 92,316.

This invention relates to indicating means for elevators.

One of the objects of the invention is to provide in the elevator cab improved means for giving both passengers and operator an indication which will be perfect in accuracy at every instant during the car's travel in either direction. To attain this very desirable result, I provide a mechanically controlled indicator which is to be mounted in the car, preferably on one of the side walls, so as to be conspicuous and easily accessible to the vision of all the passengers and the car operator.

I am aware that prior to my invention herein described, electrically controlled indicators intended to be placed in the elevator cab have been invented. But the objection to such indicators lies in the large number of conductors and sensitive electrical and mechanical parts, such as low-voltage magnets and spring-controlled contacts, that are necessary to produce the operation.

With my novel mechanically-operated and controlled indicating means these objections are eliminated, and a reliable and inexpensive apparatus is obtained which not only requires little or no attention or repairs, but also produces a more satisfactory indication, since the indication given must of necessity, from the nature of the apparatus, correspond precisely with the location of the car in the hatch at every instant.

My novel mechanism is adapted particularly for placement in the elevator cab, rather than outside the hatch, and so constructed that it can be mounted entirely on the car.

One of the principal advantages of my mechanical indicating means lies in its extreme simplicity, and its independence of all other parts of the elevator control mechanism.

In this connection it is appropriate to point out that my mechanical indicator is the first, to my knowledge, which is adapted for use in the elevator cab itself, for serving the same purpose in the interior of the car which the ordinary mechanical indicator serves on the outside of the hatch; namely, giving a true indication of the position of the car relatively to the floors of the building.

Consequently one of the principal objects of this invention is to provide a mechanically driven indicator capable of being mounted on the moving car and capable of giving a correct indication of the position of the car in relation to the various landings.

Other objects and advantages will be apparent from the following description of the preferred embodiment of the invention, reference being had to the accompanying drawings, wherein:

Fig. 1 shows an elevator and a hatch therefor, with my novel indicating mechanism installed.

Fig. 2 shows a front elevation of the driving means mounted on the car.

Fig. 3 is a side elevation, partly in section, of the parts shown in Fig. 2.

Fig. 4 is a section taken on line 4—4, Fig. 2.

Fig. 5 is a larger view of the preferred form of indicator.

Fig. 6 is a view showing the interior construction of the indicator.

Fig. 7 is a section taken at 7—7, Fig. 6.

Referring to Fig. 1, numeral 1 designates an elevator hatch in which a car 2 is adapted to travel; the car being suspended from cables 3 which serve to connect the car 2 with the hoisting motor (not shown). The so-called traction type of drive is shown in the drawings by way of illustration, 4 representing the traction sheave which is driven by the hoisting motor and in turn drives the cables 3. Obviously, other types of drive for the car 2, either electric or hydraulic, may be employed, the actuating connections forming no part of this invention.

Attached to a fixed point, preferably at the top of the hatch, as shown at 5 in Fig. 1, is a cable 6 extending the entire length. This cable is to be kept taut by some suitable means. I prefer to use for this purpose a weight as illustrated at 7 attached to the lower end of the cable 6, but obviously any other means for keeping cable 6 taut which may be found convenient may be employed.

Mounted on the car is a mechanism which is adapted to be rotated by contact with cable 6 as the elevator moves up or down in the hatch. In the preferred form this mechanism comprises three sheaves, 8, 9 and 10, placed in such a position with respect to cable 6 as to cause said cable to engage a part of the peripheral groove of each sheave, as illustrated best in Fig. 2. Each of these sheaves is journalled in a bearing so as to be free to rotate as the car moves along the hatch, the bearing for the larger sheave 10 being designated by reference character 11, and the bearings for sheaves 8 and 9 by characters 12 and 13 respectively.

It is common knowledge in the elevator art that an elevator after some service has a tendency to sway from its true vertical position while traveling in its hatchway, the amount of sway varying with the speed. This swaying may be due to a number of causes, such as unequal adjustment of the platform springs, warping or disalignment of the supporting channels of the elevators or warping or disalignment of the elevator guide rails. Because of this swaying tendency of the elevator I have found it necessary to provide some means for compensating for the swaying of the elevator so that the guide sheaves 8 and 9 will remain in their proper driving engagement with the cable 6 at all times; otherwise either one of the sheaves 8 or 9, depending on the direction of sway or incline of the elevator, would incline correspondingly and would therefore be withdrawn from its proper frictional contact with the cable.

In order therefore to maintain the proper tension on cable 6, means are provided for positioning sheaves 8 and 9 in their proper relation to the larger sheave 10. Any convenient means may be employed for this purpose but I prefer to provide a pair of tension rods 14 and 15 which engage on arms 16 and 17 respectively at one end and are each slidably guided at a point substantially central therewith, preferably by means of T-head bolts 19 and 20 secured to the supporting bracket 18, as shown in Fig. 2. The arms 16 and 17 extend from bearings 12 and 13 respectively to fixed pivot points 22 and 23 respectively, which constitute the means of suspension for the sheaves 8 and 9, said pivot points being located near the center of the sheave mechanism.

Associated with the tension rods 14 and 15 is some means for adjusting the position of sheaves 8 and 9 respectively for the purpose of maintaining their tension on cable 6. In the preferred form this means consists of compression springs 24 and 25 placed on rods 14 and 15, bearing against the fixed abutments 19 and 20 respectively at one end and against movable washers 28 and 29 at the other end. The position of these washers may be changed by turning nuts 30 and 31 to attain any desired degree of tension on rods 14 and 15. Nuts 32 and 33 are also preferably provided for locking the washers 28 and 29 respectively in the desired position.

An outer bearing for shaft 35 is provided at 66 as illustrated in Fig. 3. The means for coupling sheave 10 to shaft 35 and for compensating for slippage in this motion transmitting mechanism is illustrated best in Fig. 4. In its preferred form this means consists of a washer 67 placed on the inner end 68 of shaft 35 and bearing against hub 69 of sheave 10 in the manner shown. The extreme end 70 of shaft 35 is of a reduced diameter and threaded as shown in Fig. 4, so that nuts 71 and 72 may be threaded thereto for the purpose of regulating the tension on spring 73, positioned between collar 67 and washer 74. By this means it will be obvious that rotation of sheave 10 will also rotate shaft 35, and further that a correction for any relative slippage between shaft 35 and sheave 10 can be obtained by loosening up on nuts 71 and 72 and rotating sheave 10 around shaft 35 to the correct position, after which the nuts will again be tightened to restore the proper tension to spring 73, so as to prevent further slippage between sheave 10 and shaft 35 during the operation of the car.

Attached to shaft 35 is a hub 36 having at its outer face a bevel gear 37 adapted to mesh with gear 38, which gear is attached to hub 39 adapted to rotate freely on support 40 forming part of the bracket 18. Secured to hub 39 is shaft 42 extending thru the top of the cab as illustrated in Fig. 3. To shaft 42 is attached screw shaft 43 by means of coupling 44. This shaft 43 extends downwardly in casing 45 and is threaded for the greater portion of its length as indicated at 46 in Fig. 6. The shaft is journalled in bearing 48 attached to the lower end of casing 45.

Thus it will be apparent that the rotation of sheaves 10 produced by the movement of the car along the hatch due to the co-action between said sheave and cable 6 will be transmitted to screw shaft 46 by the connection just described to cause a proportionate rotation of said screw shaft.

Obviously other means may be employed by those skilled in the art for causing the rotation of screw shaft 46 by the co-action of sheave 10 and cable 6, and it is to be understood that the means just described are shown merely by way of illustration. Furthermore, the indicator may be circular in form, or the motion thereof may be changed as desired, or the screw shaft form of connection dispensed with entirely, without departing from the scope of my invention.

Casing 45 has placed thereon a series of characters representing the various landings along the hatch, as illustrated best in Fig. 5. These characters are preferably attached to the casing by placing the same upon curved metallic strips representing arrows, as indicated at 50 in the drawings, these strips being clamped to the wall of the casing by means of another longitudinal strip 49 extending the length of the casing and secured thereto by screws 51. This longitudinal strip 49 serves to grip the arrows 50 against the casing wall, as illustrated in Fig. 7. If it is desired to move the characters slightly up and down along the casing wall for any reason this may be done by loosening screws 51, sliding the arrows to their new positions and then reclamping the strip 49 against the arrows by tightening screws 51.

Where a circular indicator of the type referred to in the preceding paragraph is employed in place of the vertical type shown in the drawings, it is obvious that the same means may be employed for varying the position of the different characters.

In addition to these ordinarily stationary characters representing the floor landings there is a movable indicator or pointer, such as designated by character 52 in Figures 5 and 7. This indicator is made preferably in the form of an arrow curved to conform to the contour of casing 45 and extending part way around the same to the point 53 where the wall of casing 45 is slotted longitudinally the entire length of the travel of arrow 52. Extending thru this slot indicated at 53 in Fig. 7 is a lug 54 which is integral with arrow 52. Screw 57 serves to attach lug 54 to nut 56, the latter being threaded on screw shaft 46 so that rotation of said shaft causes longitudinal displacement of the nut.

Thus it will be apparent that as shaft 46 rotates in response to the movement of car 2 in the manner heretofore described, nut 56 will move along shaft 46, the direction of movement depending upon the direction of rotation of sheave 10 which in turn depends upon the direction of movement of car 2. It will be further apparent that movement of nut 56 thus produced will be imparted to arrow 52 to cause the same to travel along the wall of casing 45 to give the desired indication.

Suitable stops are provided to limit the movement of the traveling nut 56. These stops are shown here as formed by means of shoulders 70, 70 on the nut, which shoulders are adapted for contact with corresponding shoulders formed on the collars attached to the ends of the screw-shaft; the lower collar being shown at 71 in Fig. 6 and the shoulders thereon at 72, 72.

This arrangement affords a means for preventing overtravel of the arrow 52, and provides further assurance that the reading of the indicator will remain correct.

Casing 45 may be mounted in any desired manner in the car, but for the sake of illustration is shown in the drawings as threaded in collars 60 and 61 secured to the roof of car 2, as illustrated in Fig. 3, which forms an upper support therefor; while a bottom support is provided in bracket 63, to which the casing 45 is secured by means of lug 64, as illustrated in Fig. 5.

While I have shown and described the preferred embodiment of my invention herein, I do not wish to limit myself to this specific construction, but only by the scope of the invention as suggested herein, and as defined in the appended claims.

I claim:

1. An indicator for elevators comprising a casing, a pointer movable along the outer face of said casing, a series of indicating strips also on the outer face of said casing and past which said pointer moves, a floor designating character on the front surface of each of said strips, and means for holding said strips in position against the face of said casing comprising a single securing strip extending across the front surfaces of said indicating strips and means for fastening said securing strip to said casing, said securing strip serving as the sole holding means for said indicating strips.

2. An indicating mechanism for use with elevators comprising a movable pointer located within the elevator, a series of characters across which said pointer is adapted to move, said characters representing floor landings, means for moving said pointer across said characters in consonance with the movement of the elevator comprising a track weighted and suspended vertically in the hatchway, a bracket mounted on the car, a triple sheave mechanism supported on said bracket consisting of a central sheave on one side of said track and two guide sheaves on the other side of said track, each pivotally mounted on an arm extending radially from a point in the approximate center of said mechanism, means for compensating for the swaying of the elevator during travel in the hatchway comprising a positioning rod secured to each of said radial arms for radially shifting the guide sheaves toward said central sheave and into proper engaging relation to said track to cause rotation of said central sheave in true synchronism with the travel of the elevator, and a spring on each positioning rod for causing said rod to exert a pull on its corresponding guide sheave to hold the latter constantly in proper driving engagement with the cable and means for independently adjusting each of said springs, and means for transmitting the motion of said central sheave to said pointer, said means comprising a speed reducing mechanism connecting said sheave with said pointer.

Signed at Hoboken, N. J. March 2nd, 1926.

CYRUS W. BASSETT.